No. 757,120. PATENTED APR. 12, 1904.
J. B. JARMIN.
PLOW.
APPLICATION FILED DEC. 2, 1903.
NO MODEL. 8 SHEETS—SHEET 4.

No. 757,120. PATENTED APR. 12, 1904.
J. B. JARMIN.
PLOW.
APPLICATION FILED DEC. 2, 1903.
NO MODEL. 8 SHEETS—SHEET 7.

Witnesses: Inventor

No. 757,120. PATENTED APR. 12, 1904.
J. B. JARMIN.
PLOW.
APPLICATION FILED DEC. 2, 1903.
NO MODEL. 8 SHEETS—SHEET 8.

Witnesses:
Inventor:
James B. Jarmin
By Raymond H. Barnett
Attys

No. 757,120. Patented April 12, 1904.

UNITED STATES PATENT OFFICE.

JAMES B. JARMIN, OF MADISON, WISCONSIN, ASSIGNOR TO AMERICAN PLOW COMPANY, OF MADISON, WISCONSIN, A CORPORATION OF WISCONSIN.

PLOW.

SPECIFICATION forming part of Letters Patent No. 757,120, dated April 12, 1904.

Application filed December 2, 1903. Serial No. 183,540. (No model.)

*To all whom it may concern:*

Be it known that I, JAMES B. JARMIN, a citizen of the United States, residing at Madison, in the county of Dane and State of Wisconsin, have invented certain new and useful Improvements in Plows, of which the following is a specification.

My invention relates to improvements in riding-plows.

Among the objects of my invention are the following: First, to provide a plow which will quickly descend point first to any predetermined depth, will automatically level itself at that depth, and will rise point first when the plow is lifted from the furrow, thereby providing a plow which will produce a furrow of full depth for substantially its entire length; second, to provide a plow which is so flexibly mounted in its frame that it will automatically rise over obstructions, such as stones, and following the upper surface of the obstruction will immediately and automatically return to its plowing depth; third, to provide such a plow which at the will of the operator may be held locked at a given depth until released by the action of the operator; fourth, to provide simple and effective means for adjusting such a plow for any desired depth of furrow, and, fifth, to provide a mounting for the plow so constructed that sharp corners may be turned while the plow is at work without any tendency to upset the plow. These and such other objects as may hereinafter appear are attained by the devices illustrated in the accompanying drawings, in which—

Like figures and letters of reference indicate the same parts in the several figures of the drawings.

Referring to the accompanying drawings, 1 is the main frame of the plow, shown in the form of a parallelogram comprising the sides A B and ends C D. The end C is provided with a familiar form of yoke arranged in the usual manner to permit vertical play of the plow-beam. The frame 1 is supported, by means of bearing-heads 2 and 3, upon the bent axles of the furrow-wheels 4 and 5, respectively, and is also supported in a manner hereinafter described by the land-wheel 6.

Secured to the sides A B, respectively, are downwardly-extending brackets 7 and 8, which provide journal-bearings for the main shaft 9. The shaft 9 is journaled at one end directly in the bracket 8, is bent between the sides A B of the frame to form a bail 10, extends through a casting 11, which casting is journaled in the bracket 7, thence through a filling-piece 12, and through a sleeve E, formed on a casting 13, to a segmental rack 14, which is rigidly secured to the landside end of the shaft 9. The casting 13 comprises a sleeve E, through which the shaft 9 extends, a sleeve F, which is rotatively mounted upon the axle of the land-wheel 6, and arms which rigidly connect the sleeves E and F with each other. Only one of said arms is shown, the other being hidden, in the drawings, behind the leveling mechanism. Suitably and rigidly secured to another arm of the casting 13 is the leveler arm or lever 15, upon which is reciprocatingly mounted a spring-pressed dog 16, which is normally held in engagement with the teeth of the segmental rack 14 by a spring 17.

The casting 11 comprises a segmental rack G, extending upwardly from a cylindrical portion H, which serves to keep the rack G properly spaced from the inner face of the bracket 7. One end of the cylindrical portion H affords an annular shoulder which abuts against the inner face of the bracket 7 and leads to a smaller cylindrical portion I, which is journaled within the bracket 7. Beyond the bearing within the bracket 7 the casting 11 is again reduced to a still smaller cylindrical portion J, which is provided with an integral rib or key K. Mounted upon the portion J is a sleeve 18, which is provided with a keyway which fits snugly over the rib or key K. The sleeve 18 comprises an arm L and oppositely-disposed lugs M and N. Pivotally mounted upon the arm L is a lever 19, provided at one end with an inwardly-extending lip. This lip normally engages a vertical shoulder formed upon a rib O upon the outer face of the bracket 7. The lip upon the lever 19 is held in engagement with said shoulder by a spring 20, which is secured at one end to the lever 19 and at its opposite end to the lug N.

Pivoted to the lug M is a foot-lever 21, comprising duplicate arms secured together so as to provide a space therebetween, within which space one arm of the lever 19 plays. Extending across this space is a pin P, which engages a slot in the upper edge of said arm of the lever 19, said slot having an inclined or cam-faced wall extending toward the outer end of said arm. Q is a cross-pin carried by said arm of the lever 19 and extending in the path of the foot-lever 21. It will thus be seen that when the foot-lever 21 is moved in a forward and downward direction the pin P engaging the cam-face of the slot in the lever 19 will depress that end of the lever 19 and will thereby raise the lip end of the lever out of engagement with the shoulder upon the bracket 7. The further travel of the lever 21 will bring it in engagement with the cross-pin Q, whereupon the cross-pin, now acting as a link between the lever 21 and the arm L upon the sleeve 18, will rotate the sleeve 18 in a forward direction, and by reason of the keyed connection of the sleeve 18 with the casting 11 the casting 11 and all of its parts will be correspondingly moved.

Extending from the inner end of the casting 11 is a pair of integral clamping-arms $h$, which are arranged eccentrically to the axis of the cylindrical portion H and which are clamped around that part of the shaft 9 which is bent to form one arm of the bail 10. Consequently the bail 10 moves in unison with the casting 11.

22 is a second foot-lever which is rigidly secured to a bracket 23, said bracket being rotatively mounted upon a bearing 24, arranged upon the side A of the frame 1 and forwardly from the bracket 7. The segmental rack G is connected with the lower end of the lever 22 by a link 25, which is pivoted to the lower end of the lever 22 and is also pivoted to the rack G at a point above its lower end. It will thus be seen that the forward and downward movement of the free end of the lever 22 will cause the backward rotation of the rack G and connected parts, including the bail 10, until the lip upon the lever 19 is snapped by the spring 20 back into engagement with the shoulder upon the rib O. By this arrangement of levers the bail 10 may be raised or lowered by the feet of the rider as the rider sits in the seat 26, which is mounted upon the frame 1, leaving the hands of the operator free.

The plow-beam 27 is pivotally mounted upon the bail 10 by means of brackets 28, which are clamped to the plow-beam and extending downwardly therefrom are journaled upon the bail 10. Connected at one end with one of the brackets 28 and extending backwardly to an adjusting-rod 29, which is secured to a lug upon the end D of the frame 1, is a powerful spring 30. It will thus be seen that the lowering of the plow by the depression of the lever 21 is assisted by the weight of the plow, the descent of which puts the spring 30 under tension, so that the reverse operation produced by the depression of the lever 22 is assisted by the contraction of the spring 30, which assists in lifting the weight of the plow.

The bracket 7 extends over the upper edge of the side A of the frame 1 and is provided with a shoulder $b$, which extends beyond the inner face of the side A and in the path of an arm 31. This arm 31 is pivotally mounted upon the inner face of the rack G and carries a spring-pressed dog which engages the teeth of the rack G in a familiar manner, said dog being connected by a rod with a handle 32, by means of which the dog may be lifted out of engagement with the rack G and held out of engagement while the arm 31 is moved upon its pivot to any desired position, whereupon the handle 32 being released the dog locks the arm 31 in its new position, so that when the arm 31 is brought by the operation of the machine into contact with the stop $b$ said stop serves as a stop to the movement of the rack G, and so of course acts effectively as a stop to limit the travel of all parts which are rigidly connected with the rack G. As I may thus limit the forward and downward movement of the bail 10, and so of the plow-beam 27, which is carried thereby, I am enabled by this arrangement to limit the depth to which the plow may descend in the ground, and in this way I am enabled to determine beforehand the depth of the furrow. If it be desired to lock the plow in position at the bottom of the furrow, this result may be attained by means of a dog 33, which is pivotally mounted upon the bracket 7 in such a position that it may be swung upon its pivot into position directly behind the arm 31 when the arm 31 is resting against the stop $b$, thereby effectively preventing the reverse movement of the arm 31 and connected parts.

Figure 1:
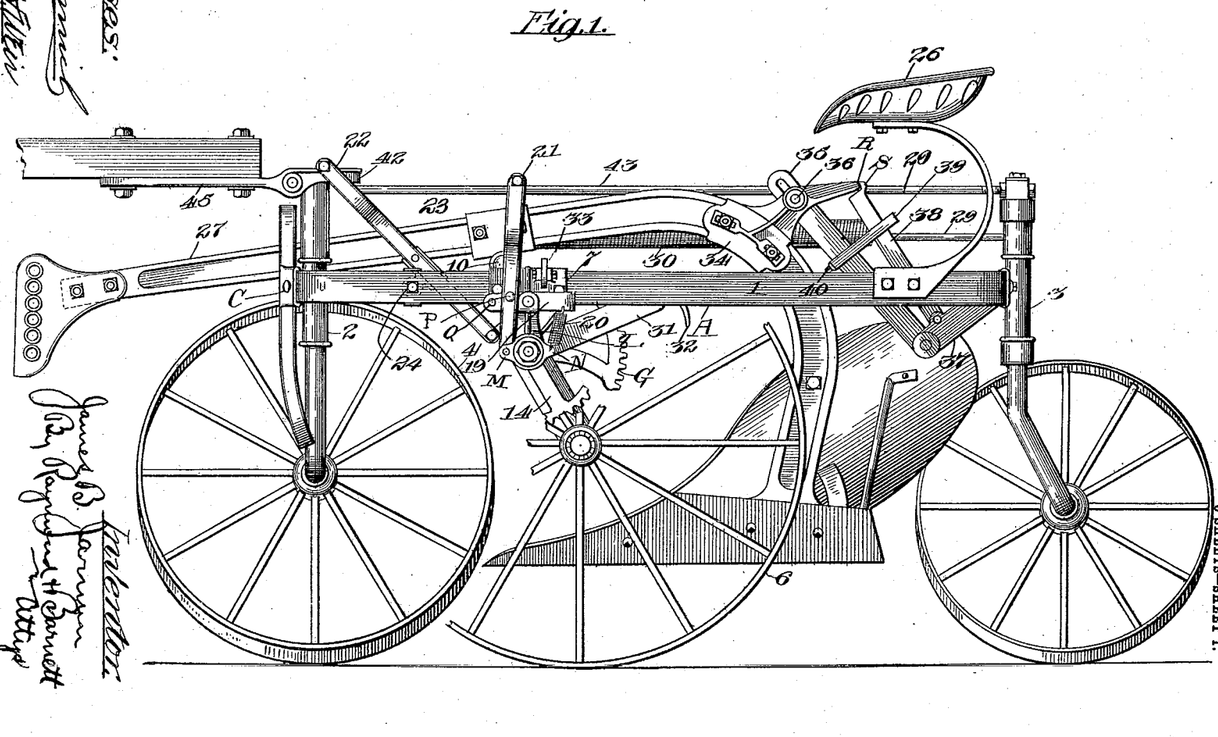
Figure 1 is a view of the landside of the plow, the plow being shown in its raised position and the wheels running on level ground.
Figure 2:
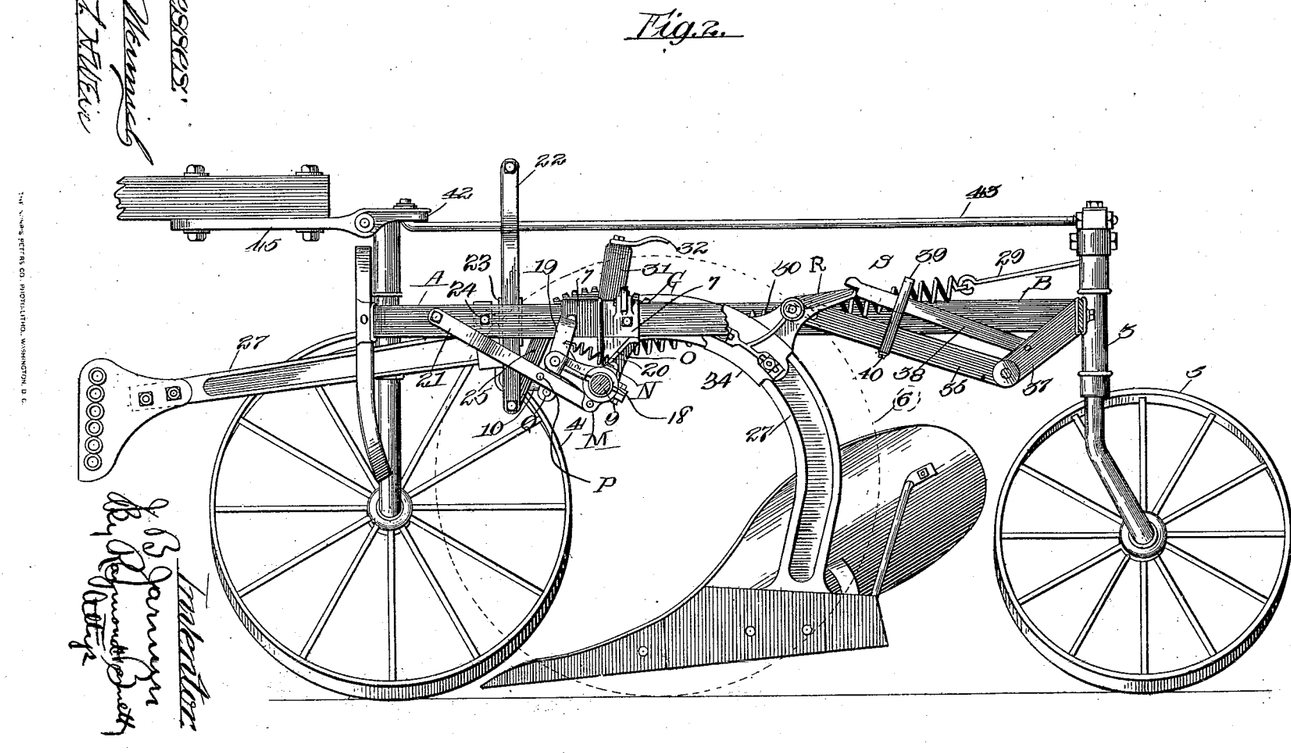
Fig. 2 shows the position occupied by the parts as the plow descends point first to the bottom of the furrow.
Figure 3:
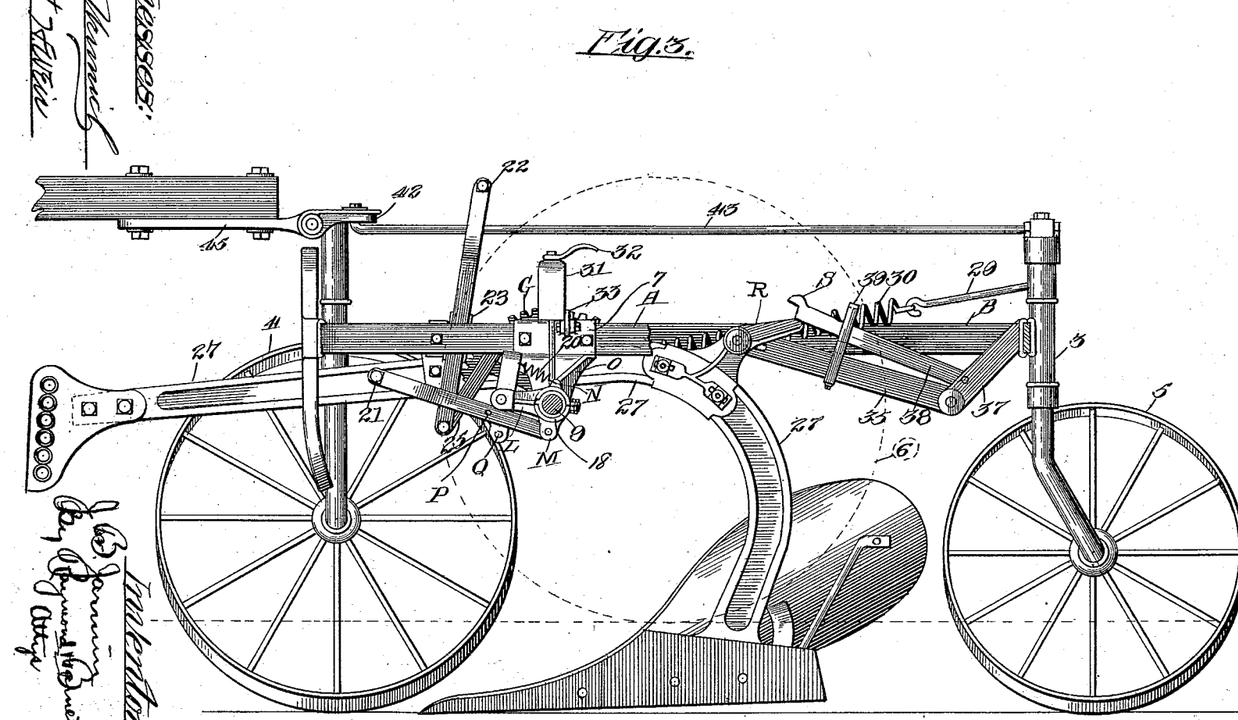
Fig. 3 shows the position of the parts after the plow has automatically leveled itself at the bottom of the furrow.
Figure 4:
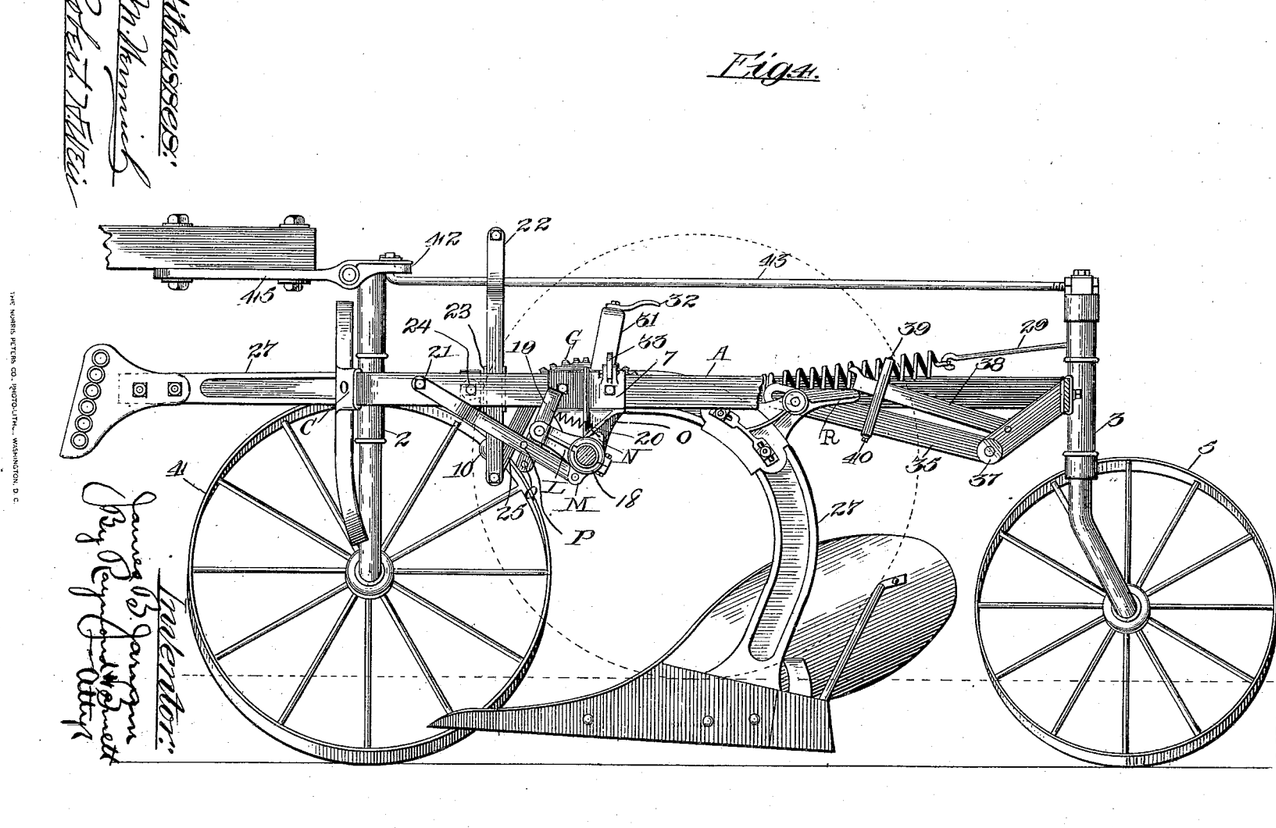
Fig. 4 shows the position occupied by the parts as the plow starts to rise point first either when being lifted from the furrow by the operator or when automatically lifting itself over an obstruction.
Figure 5:
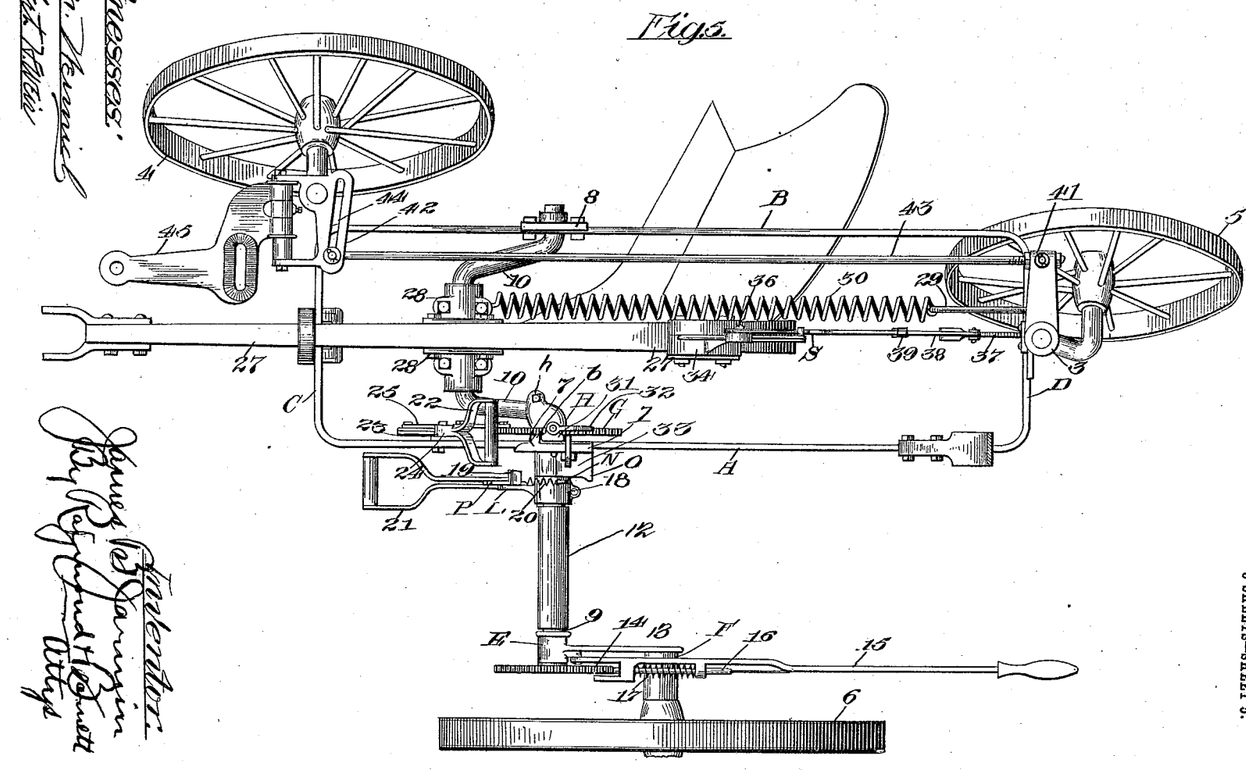
Fig. 5 is a plan view.

Secured to the plow-beam 27 behind the brackets 28 is an adjustable clip 34, formed of duplicate sides, between the bases of which the plow-beam is clamped. From their bases these sides extend upwardly and outwardly to form an arm R, to which is movably connected a link 35. This link 35 is slotted at its upper end. Extending across the space between the sides of the clip 34 and through the slot in the link 35 is a pin 36. The lower end of the link 35 is pivoted to the lower end of a casting 37. 38 is another link which is pivoted to the casting 37, but at a point above and behind the pivotal engagement therewith of the link 35. The upper end of the link 38 normally rests under the extreme end of the arms of the clip 34 and is held in that position by a shoulder S. It will thus be seen that the rear of the plow-beam is supported when the parts are in the position shown in Fig. 1 by the link 35 and the casting 37. It will also be noticed that in this position the arms 35 and 38 diverge upwardly from each other. Another point to be noted is that the arms of the bail 10 are shorter than the link 35 and the link 38 and that in the position shown in Fig. 1 the arms of the bail 10 stand in a position much closer to the vertical than either the links 35 or 38. As a result of this arrangement the operation of the mechanism is as follows: As the lever 21 is depressed the arms of the bail 10 travel forwardly and downwardly over a much larger segment of a circle than that described in the same time by either the link 35 or the link 38. The result of this is, first, to carry the beam 27 forwardly with relation to the arm 35, so that the pin 36 is lifted out of engagement with the bottom of the slot in the link 35 and the weight of the rear of the plow is supported by the link 38. At the same time the forward end of the plow-beam is carried in a downward direction much more rapidly than the rear end, which is supported first by the link 35 and then by the link 38, and consequently the point of the plow is depressed, as shown in Fig. 2, and the plow descends forwardly and downwardly, with a marked depression of the point of the plow. So, also, the end of the arm of the clip 34 approaches the link 35.

39 is a yoke which is adjustably clamped to the link 35 by means of a set-screw 40. This yoke is provided with a slot through which passes the link 38. The link 38 is normally out of engagement with the bottom of this slot. The distance between the bottom of this slot and the link 38 when in the position shown in Fig. 2 is determined by the longitudinal adjustment of the yoke 39 upon the link 35. Consequently as the end of the arm of the clip 34 approaches the link 35 with the downward movement of the plow-beam the distance between the links 35 38 is correspondingly lessened until the link 38 is brought in contact with the bottom of said slot, which acts as a stop to the further movement of the link 38 in this direction, so that the continued relative downward movement of the arm on the clip 34 will disengage the end of said arm from the upper end of the link 38, whereupon the rear of the plow being deprived of the support of the link 38 will drop until the pin 36 rests upon the bottom of the slot in the link 35. The yoke 39 is so adjusted that this tripping action will occur when the point of the plow has reached its position at the bottom of the furrow, and the length of the slot is such that this lost motion will make up for the difference in the previous relative downward travel of the point and the heel of the plow, so that the heel of the plow will overtake the point and the plow will rest level or as nearly level as is desired. It will thus be seen that the location of the clip 34 upon the plow-beam 27 will determine to what extent, if at all, the heel of the plow in plowing position shall be above the point. As it is desirable to vary this position according to the nature of the soil being plowed in order to overcome friction, suction, &c., the clip 34 is made adjustable with relation to the plow-beam 27. When now the lever 22 is depressed, thereby elevating the bail 10, it will be seen that the rear of the plow is pivotally mounted upon the upper end of the link 35 and is carried by said link. The bail 10 will begin to rise when its arms are lying much closer to a horizontal plane than the link 35. Consequently the bail 10 will travel upward more rapidly than the outer end of the link 35, with the result that the forward end of the plow-beam will be elevated more rapidly than the rear end, the point of the plow will be correspondingly elevated, and the plow will rise out of the ground point first, thereby enabling it to cut its way from the bottom of the furrow to the surface of the ground. When the bail 10, however, has passed its maximum upward speed and has reached a point where it is traveling more rapidly backward, the link 35 will be rising at a speed which is more rapid than the upward movement at the same time of the bail 10, so that while the bail 10 is accelerating the backward travel of the plow-beam the link 35 will be accelerating the upward travel of the rear end of the plow-beam, with the result that as the parts reach their elevated position, as shown in Fig. 1, the heel of the plow will have overtaken the point of the plow, so to speak, and the point and heel will once more hang level. At the same time there will be a relative rotation of the plow-beam and the clip 34 upon the pin 36 as a center, with the result that the end of the arm of the clip 34 will be carried continually farther away from the link 35 until the space between the end of said arm and the pivot upon which the lower end of the arm 38 is mounted will have become wide enough to permit the arm 38 to drop in position under the end of the arm of the clip 34. Thus the parts will have resumed their original position, the plow will have descended point first into the ground, will have automatically leveled itself when the plowing depth, determined by the adjustment of the arm 31, has been reached, will have risen point first, cutting its way out of the ground, and will have automatically leveled itself in its elevated position. Not only do I by this arrangement attain the results above set forth, but I also produce a plow having a floating mount in its frame so arranged that as the plow encounters a stone the plow may swing in its mounting, so as to permit the point of the plow to be elevated by the stone, so that the plow will rise within its frame point first and with heel depressed without bringing any lifting strain to bear upon the plow-frame. The plow-point will be depressed as soon as the apex of the stone passing under the plow elevates the heel of the plow, and thereupon the plow will promptly descend point first to the bottom of the furrow, where it will automatically level itself once more. In this manner I take from the plow all that strain which is incidental to those structures in which the plow cannot pass over a stone without lifting the carriage-frame in whole or in part, and by my mounting, which permits the plow to automatically rise point first and descend point first, the plow cuts its way upward, thereby avoiding the strain incident to tearing it upwardly while the plow remains in a level position, and not only so, but the plow will cut its way upward and thence down again to the bottom of the ground immediately adjacent to the surface of the stone, so that the continuity of the furrow is not materially affected except as the furrow is obstructed by the bulk of the stone. There is no considerable section of ground which is passed over by the plow in reaching the bottom of the furrow after passing the stone. If after the plow reaches the bottom of a furrow it is locked in position by means of the dog 33, as previously described, the plow is still free to swing to a limited extent upon the bail 10, because of the slotted engagement between the clip 34 and the link 35. This allows a limited play to the plow with relation to its carriage or frame, so that the plow may accommodate itself to any slight irregularities which the wheels, especially the land-wheel, may encounter.

Figures 6, 8:
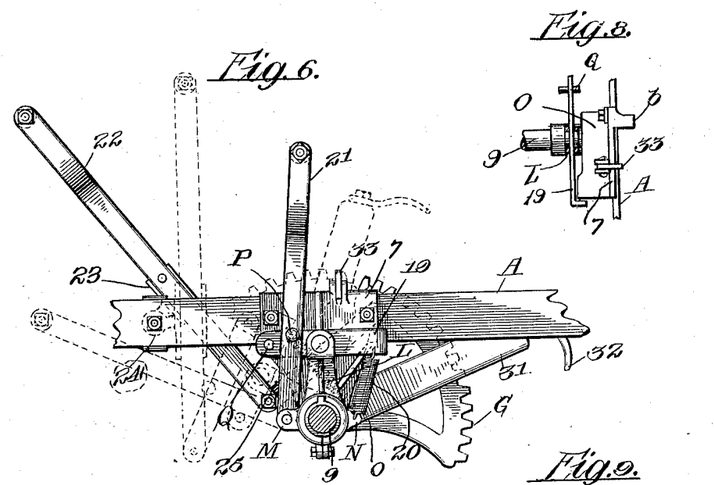
Fig. 6 is a detail of the plow-operating apparatus, showing the parts in the position assumed when the plow is at its highest position, the position assumed as the plow is partially raised being shown in dotted lines.
Fig. 8 is a plan view of a detail of the depth-gage device.
Figure 7:
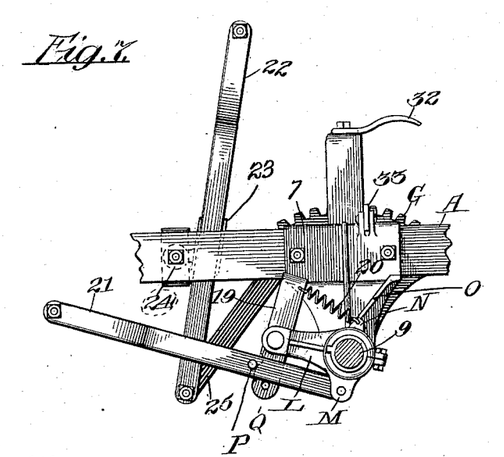
Fig. 7 is a detail of the same parts, showing them in the position assumed when the plow is at the bottom of a furrow.
Figure 9:
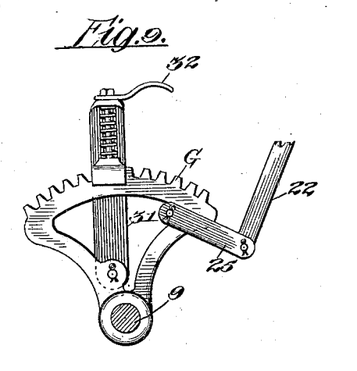
Fig. 9 is a side elevation thereof.
Figure 10:
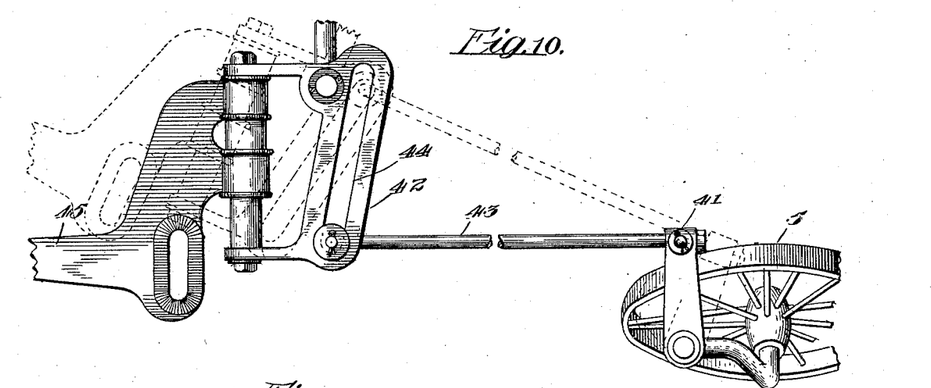
Fig. 10 is a detail of the upset-preventing device.

One principal defect in sulky-plows is that in turning to the right the rear furrow-wheel will cramp against the land side of the furrow at a time when the forward furrow-wheel is turned wholly or partly under the plow, and will thus force the plow-carriage over and will upset the plow, oftentimes with considerable consequent damage in addition to the inconvenience. It is well known that this is a very frequent happening with sulky-plows. As commonly constructed, the furrow-wheels are mounted upon bent axles arranged eccentrically to the bearing-heads in a peculiar but well-known manner, and the vertical portions of the bent axles, which extend through the bearing-heads, are connected with each other by means of lever-arms and a connecting-rod, the lever-arm of the forward furrow-wheel being connected with the pole to which the horses are hitched, all in such a manner that when the forward furrow-wheel is swung to the right the rear furrow-wheel will be pulled to the left. It will thus be seen inasmuch as the rear furrow-wheel normally runs in such a manner as to abut against the land side of the furrow that this turning of the forward furrow-wheel will cramp the rear wheel against the land side of the furrow, with a resulting tendency to uset the plow. I overcome this serious defect without interfering with the necessary relative operation of the forward and rear furrow-wheels in the following manner: Clamped to the upright end of the bent axle of the rear furrow-wheel 5 is a lever-arm 41, while similarly secured to the upright end of the bent axle of the forward furrow-wheel 4 is a lever-arm 42. Attached to the lever-arm 41 and extending forwardly is a rod 43, which pivotally engages a slot 44 in the lever-arm 42. This slot 44 extends along the lever-arm 42 transversely of the carriage and diagonally to the axis of the machine, as shown. Secured in the usual way to the lever-arm 42 is the pole-arm 45, which is clamped to the pole of the machine. When in turning to the right the furrow-wheel 4 is turned to the right, the furrow-wheel 5 will be cramped against the vertical land side of the furrow in which it is running. With my arrangement, instead of causing the furrow-wheel 5 to push against the land side of the furrow, the resistance of the furrow-wheel 5 will cause the lever-arm 42 to slide around the end of the rod 43, as shown in Fig. 6, so that the forward furrow-wheel is free to turn to the right, so as to turn the machine, while the rear furrow-wheel is free to turn forwardly in the furrow and gradually out of the furrow across the plowed ground without being cramped against the land side of the furrow. It is well understood in this art that the furrow-wheels are so mounted that their constant tendency is to swing to the left—*i. e.*, against the land side of the furrow—so as to bring a constant pressure to bear, which shall relieve the landside of the plow. Consequently when the plow is turned and the rear furrow-wheel is disengaged from the land side of the furrow its tendency to turn to the left will bring a longitudinally forward pressure to bear upon the rod 43, and owing to the inclined arrangement of the slot 44 the forward end of the rod 43 will move along the line of least resistance and will promptly resume its original position at the outer end of the slot 44. In turning to the left the rear furrow-wheel will be held from turning by the land side of the furrow, the forward end of the rod 43 meanwhile sliding toward the inner end of the slot 44, the forward furrow-wheel being meanwhile free to turn squarely around the corner. The continued forward movement of the plow will cause the rear furrow-wheel to follow, and as it clears the first furrow and resumes its straight position the rod 43 will again return to the outer end of the slot 44.

Figure 11:
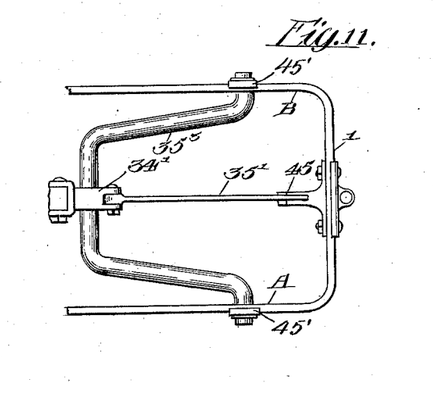
Fig. 11 is a detail of a modified bail.
Figure 12:
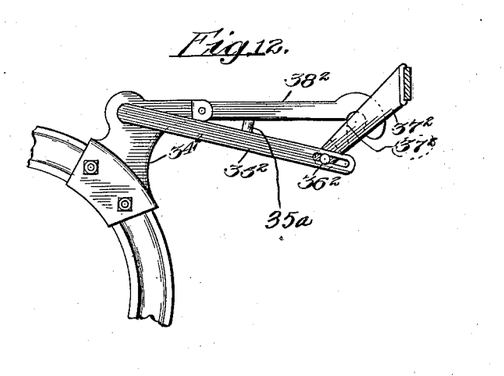
Fig. 12 is a detail of a modification of the plow-tilting apparatus.
Figure 13:
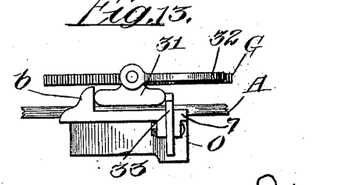
Fig. 13 is a detail of the plow-locking device.
Figure 14:
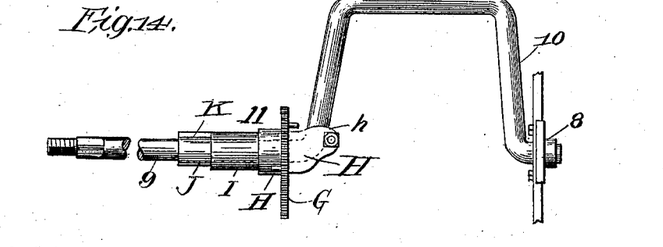
Fig. 14 is a detail in elevation of the bail and the bearing-casting.
Figure 15:
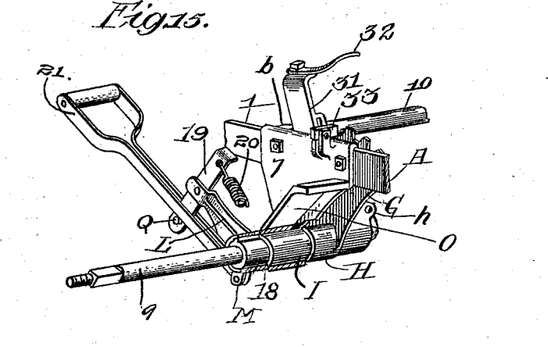
Fig. 15 is another view of the same.
Figure 16:
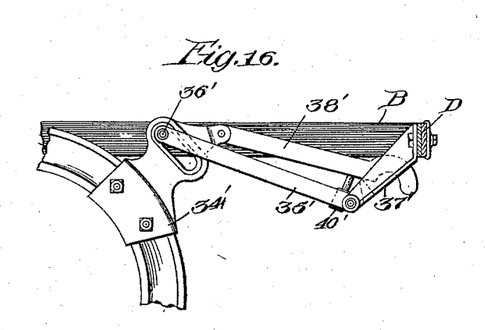
Fig. 16 is a detail of another modified form of the apparatus for controlling the heel of the plow.
Figure 17:
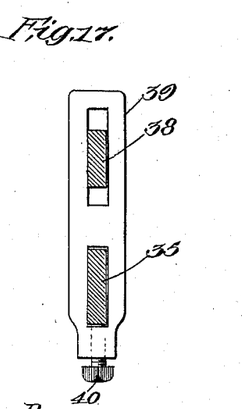
Fig. 17 is a detail of the trip-yoke.

In Figs. 11, 12, and 16 I have shown three different modifications of the arrangement for getting the differential movement of the heel of the plow with relation to the point of the plow.

In Fig. 16 I have shown a clip 34' secured to the plow-beam and provided with a slot, within which plays a pin 36', carrying a pair of links 35', only one of which is shown secured thereto upon opposite sides of the clip 34'. The lower ends of these links are pivoted to the lower ends of a casting 37'. Pivoted to the outer end of the arm upon the clip 34' is a link 38', which in raised position rests upon a shoulder extending across the bottom of the slot in the casting 37', said shoulder being above and behind the end of the casting 37' to which the links 35' are pivoted. Extending between the links 35' is a lug carrying a screw 40', which serves as a stop to trip the link 38' out of engagement with the shoulder on the casting 37' when in the descent of the plow the links 38' and 35' reach a predetermined distance from each other.

In the modification shown in Fig. 12 I have shown a clip $34^2$ mounted upon the plow-beam and carrying a pair of links $35^2$, only one of which is shown, which are pivoted to said clip upon opposite sides thereof and which are provided at their lower ends with slots which engage a pin $36^2$, projecting from the opposite sides of a casting $37^2$. Pivoted to the outer end of the arm upon the clip $34^2$ is a link $38^2$, which engages a shoulder upon the casting $37^2$ and is tripped therefrom in substantially the same manner as described in the last modification.

In the modification shown in Fig. 11 the principal variation from the modification shown in Fig. 16, above described, is the substitution of a bail $35^3$, the transverse portion of which extends through the slot in the clip 34', so that the bail takes the place of the pin 36' and the links 35'; but in this modification the lower ends of the bail are journaled in brackets 45', which are secured to and extend below the sides A and B of the frame 1.

While I have described in detail the preferred embodiment of my invention, and while I have also described some of the more obvious modifications thereof, it will be understood that my invention is not limited to any of the embodiments thereof shown or described, but may be embodied in various other ways without departing from the spirit thereof, especially so long as the plow is so mounted that the heel of the plow both in its initial downward and upward travel moves more slowly than the point of the plow, so that the plow descends into and rises out of the ground point first, provision being also made for allowing the heel of the plow in its downward travel to overtake the point of the plow, so that as the point of the plow approaches the predetermined plowing depth the heel of the plow will also descend to proper plowing position.

I claim—

1. In a plow, mechanism for putting the plow into the ground point downward, for automatically leveling the plow at a predetermined depth, for raising the plow out of the ground point first and for automatically adjusting it in position for reëntering the ground, said mechanism comprising a support pivotally connected with the forward part of the plow-beam and a plurality of rear supports connected with the plow-beam, one of said rear supports having a lost-motion connection at one end, and the other of said rear supports being arranged to be alternately thrown into and out of operation.

2. The combination in a sulky-plow, of a support pivotally connected with the forward part of the plow-beam and carried by the structure, of a support also carried by the structure, pivotally connected with the rear portion of the plow-beam and having a lost-motion connection at one end, a third support, means arranged to automatically throw said third support out of operation as a support at a certain stage in the descent of the plow, and for resetting the same into supporting position at a stage in the raising of the plow, and means for raising and lowering the plow, all so arranged that the initial movement of the plow-point upwardly and downwardly will be more rapid than the movement of the heel of the plow, thereby causing the plow to descend point first into the ground and to rise point first out of the ground.

3. The combination with a frame, of a plow, a pair of arms, pivotally connected with said frame, having a pivotal connection with said plow and arranged to support the plow in the frame, supporting means comprising a link pivotally connected with the plow and with the frame, behind said arms, one of said connections being a slotted connection, and a second link extending from the frame to the plow and having rocking bearings at each end, and means, operated by the movement of the plow to plowing position, whereby said last-named link is tripped from one of its bearings.

4. The combination with a frame, of a bail pivotally mounted therein, a plow carried by said bail, a pair of link-arms, of greater length than the arms of said bail, arranged, to alternately support the plow, within said frame and behind said bail, and means operated by the descent of the plow to plowing position, whereby one of said arms is tripped out of supporting position and the rear of the plow drops until it is supported by the other of said arms.

5. The combination with a frame, of a bail pivotally mounted therein, a plow pivotally carried by said bail, a link of greater length than the arms of said bail, pivotally secured at one end to said frame and at the other end to said plow behind said bail, one of said connections being a slotted connection, a second rocking link also longer than the bail-arms and extending between the frame and a portion of the plow structure, all so arranged that the rear of the plow will be supported by the last-named link as the plow moves downwardly, and means interposed in the path of the last-named link for tripping it out of supporting position as the point of the plow approaches plowing position.

6. The combination with a frame, of a bail pivotally supported thereby, a plow pivotally supported by said bail, an arm extending from the plow-beam back of said bail, a pin carried by said arm, a link having slotted engagement with said pin and of greater length than the bail-arms, said link being pivotally supported at its lower end by a part of the structure, and a second link of greater length than the bail-arms, said link extending from a fixed point on the structure to a bearing-surface of the arm carried by the plow-beam, having a rocking bearing at each end and diverging from said first-named link, all so arranged that the last-named link will support the rear of the plow as the plow descends, and means interposed between said links whereby said last-named link is tripped out of supporting position whenever the plow descends to a predetermined point.

7. The combination with a frame, of a plow, a pivotal support for the front part of the plow, a pair of differential supports for the back part of the plow, all so arranged that the plow will descend point first into the ground, and means actuated by the descent of the plow whereby the weight of the back part of the plow will be automatically shifted from one to the other of said differential supports as the plow reaches a predetermined depth, whereby the plow will automatically level itself after descending point first into the ground.

8. The combination with a frame, of a plow, means moving in the arc of a circle for supporting the forward end of the plow within said frame, a plurality of supports moving in the arc of a larger circle than said first-named means, for supporting the back part of the plow within said frame, one of said last-named supports having a slotted engagement with a part of the structure between the frame and the plow, and a device whereby upon the descent of the plow to a predetermined depth the weight of the back part of the plow is automatically shifted from one of said last-named supports to the slotted supporting device.

9. The combination with a frame, of a plow, a bail carrying the plow and journaled within the frame, a segmental rack pivotally supported in the frame and arranged to move in unison with the bail, an arm movably mounted on said rack, means for locking said arm in different positions upon said rack, and a stop interposed in the path of said arm.

10. The combination with a frame, of a plow carried thereby, means for raising and lowering the plow in said frame, an arm mounted to move in unison with said plow-operating means, mechanism for locking said arm in a plurality of positions, and a stop interposed in the path followed by said arm during the lowering of the plow.

11. The combination with a frame, of a plow carried thereby, means for lowering the plow in said frame, a segmental rack arranged to be rocked by the operation of said plow-lowering means, a movable arm mounted upon said rack, means for locking said arm at different positions on the periphery of said rack, and a stop interposed in the path described by said arm during the descent of the plow.

12. The combination with a frame, of a plow mounted therein, means for lowering the plow in said frame, a segmental rack arranged to be moved by said plow-lowering means and arranged to be swung on its axis thereby, an arm pivoted to said rack, a spring-pressed dog carried by said arm and arranged to engage the teeth of said rack so as to lock the arm in any adjusted position on said rack, and a stop interposed in the path described by said arm during the descent of the plow.

13. The combination with a frame, of a bail journaled thereto, a plow pivotally supported by said bail, a segmental rack connected with said bail so as to move in unison therewith and upon their common axis, an arm pivoted to the rack, a spring-pressed dog carried by the arm and arranged to engage the teeth of the rack, and a stop carried by the frame and arranged in the path described by the arm during the downward movement of the plow.

14. The combination with a plow-frame, of a pair of brackets carried thereby, a sleeve journaled in one of said brackets, a stop carried on said sleeve, means, carried by the frame, for engaging said stop, a plow-carrying bail, journaled at one end in one of said brackets and extending at the opposite side of the frame through the sleeve and rigidly secured to said sleeve, a foot-lever journaled to the frame, operative connections between said foot-lever and said sleeve, whereby the sleeve may be rotated upon its axis by the operation of said lever, a second sleeve rigidly secured to said first-named sleeve, a second operating-lever, and operative connections between said second lever and said second-named sleeve, whereby the bail may be moved upon its axis, a shoulder upon the frame, a pivoted lever carried by said last-named sleeve and arranged to lock said shoulder, a spring arranged to hold said lever in locking engagement with said shoulder, and means, operated by the forward movement of the last-named operating-lever, for disengaging said pivoted lever from said shoulder.

JAMES B. JARMIN.

Witnesses:
   JAMES P. CORRY,
   JACKSON REUTER.